United States Patent [19]
Sidi

[11] 4,293,475
[45] Oct. 6, 1981

[54] PIGMENT DISPERSIONS FOR SURFACE-COATING COMPOSITIONS AND SURFACE-COATING COMPOSITIONS CONTAINING SAME

[75] Inventor: Henri Sidi, Paramus, N.J.

[73] Assignee: Tenneco Chemicals, Inc., Saddle Brook, N.J.

[21] Appl. No.: 186,890

[22] Filed: Sep. 12, 1980

[51] Int. Cl.³ .......................................... C08F 220/20
[52] U.S. Cl. ...................... 260/29.6 TA; 260/33.4 R; 260/29.6 RW; 526/273; 526/317
[58] Field of Search ............... 260/29.6 TA, 29.6 RW; 526/273, 317

[56] References Cited

U.S. PATENT DOCUMENTS

| | | | |
|---|---|---|---|
| 3,886,107 | 5/1975 | Najvar | 260/29.6 WQ |
| 3,980,602 | 9/1976 | Jakubauskas | 260/29.6 TA |
| 4,101,480 | 7/1978 | Ruf | 260/23 AR |
| 4,102,843 | 7/1978 | Sperry | 260/29.6 RW |
| 4,164,488 | 8/1979 | Gregorovich | 260/29.4 UA |
| 4,170,582 | 10/1979 | Mori | 260/29.6 RW |
| 4,177,076 | 12/1979 | Sato | 260/29.6 TA |
| 4,181,642 | 1/1980 | Holle | 260/37 SB |

FOREIGN PATENT DOCUMENTS 2005697 4/1979 United Kingdom .
2029429 3/1980 United Kingdom .

Primary Examiner—Paul R. Michl
Attorney, Agent, or Firm—Evelyn Berlow

[57] ABSTRACT

Universal pigment dispersions for use in surface-coating compositions contain as dispersant water-soluble salts of polymers prepared from monomer mixtures containing 30% to 75% by weight of at least one hydroxyalkyl methacrylate wherein the hydroxyalkyl group has 2 to 4 carbon atoms, 20% to 65% by weight of methacrylic acid, and 2% to 20% by weight of at least one other ethylenically-unsaturated monomer, such as styrene and/or glycidyl methacrylate.

19 Claims, No Drawings

PIGMENT DISPERSIONS FOR SURFACE-COATING COMPOSITIONS AND SURFACE-COATING COMPOSITIONS CONTAINING SAME

This invention relates to pigment dispersions that are useful in the manufacture of pigmented resin-containing surface-coating compositions and to surface-coating compositions that contain these pigment dispersions. It further relates to pigment dispersants that are compatible with many resin systems and that are water-soluble salts of polymers derived from a hydroxyalkyl methacrylate, methacrylic acid, and a third monomer component that may be, for example, styrene and/or glycidyl methacrylate.

To be useful as the dispersant in multi-purpose or universally-compatible pigment dispersions, a material should not only be compatible with the acrylic, epoxy, polyvinyl acetate, alkyd, polyester, and other film-forming resins that are commonly used in surface-coating compositions to the extent of at least 3–5%, but it should also be soluble or dispersible in both polar and non-polar solvents, it should be functional with both organic and inorganic pigments regardless of their polarity or chemical functionality, it should enhance the tinctorial strength of the pigments, and it should improve the gloss, hiding power, and stability of the surface-coating compositions.

A number of polymeric dispersants have been proposed for use in universal pigment dispersions, but none has proven to be entirely satisfactory. Some do not have the required compatibility with a wide range of film-forming resins and solvents or do not have good pigment-wetting characteristics, while others adversely affect the properties of the surface-coating compositions or increase their cost appreciably.

It has now been found that water-soluble salts of polymerization products of specific monomer units are capable of acting as dispersants in multi-purpose or universally-compatible pigment dispersions because they are compatible with a wide range of film-forming resins and soluble or dispersible in both polar and non-polar solvents. Dispersions containing these dispersants can be used to disperse both organic and inorganic pigments in surface-coating compositions wherein the film-forming resin is an acrylic, epoxy, polyvinyl acetate, alkyd, polyester, aminoplast, or urethane resin. The pigment dispersions of this invention are of particular value as colorants in acrylic, polyvinyl acetate, and alkyd resin-based surface-coating compositions.

The pigment dispersants of this invention are water-soluble salts of polymers prepared from monomer mixtures containing (a) 30% to 75%, preferably 55% to 65%, by weight of at least one hydroxyalkyl methacrylate, wherein the hydroxyalkyl group has from 2 to 4 carbon atoms, for example, hydroxyethyl methacrylate, hydroxy-n-propyl methacrylate, and hydroxy-n-butyl methacrylate;

(b) 20% to 65%, preferably 30% to 40%, by weight of methacrylic acid; and (c) 2% to 20%, preferably 5% to 15%, by weight of at least one other ethylenically-unsaturated monomer that may be, for example, styrene, vinyltoluene, glycidyl acrylate and/or glycidyl methacrylate.

These polymers have acid values in the range of 160 to 400 and hydroxyl values in the range of 150 to 320; they preferably have acid values in the range of 170 to 210 and hydroxyl values in the range of 255 to 310.

The preferred pigment dispersants are the alkali metal, ammonium, and amine salts of hydroxyethyl methacrylate-methacrylic acid-styrene terpolymers, hydroxyethyl methacrylate-methacrylic acid-glycidyl methacrylate terpolymers, and hydroxyethyl methacrylate-methacrylic acid-glycidyl methacrylate-styrene tetrapolymers.

The polymers whose water-soluble salts are used as the dispersants in the pigment dispersions of this invention are prepared by polymerizing mixtures of the aforementioned monomers by known polymerization procedures. The polymerization is usually carried out in an aqueous medium that may contain a water-miscible organic solvent, such as methanol, isopropanol, tert-butanol, ethylene glycol, propylene glycol, ethylene glycol monomethyl ether, ethylene glycol monobutyl ether, diethylene glycol monoethyl ether, diethylene glycol monoethyl ether acetate, acetone, dioxane, or diacetone alcohol. The polymerization is carried out at a temperature in the range of 50° to 150° C. for 1 hour to 5 hours in the presence of a polymerization initiator that may be, for example, azobisisobutyronitrile, benzoyl peroxide, di-tert.-butyl peroxide, hydrogen peroxide, cumene hydroperoxide, or ammonium persulfate. The polymerization reaction mixture may also contain a molecular weight regulator, such as mercaptoethanol, n-octyl mercaptan, thioglycollic acid, allyl alcohol, or the like.

The aqueous polymer dispersions that result from the polymerization reaction are brought to a pH in the range of 7 to 10, preferably 8 to 9, by the addition of a basic compound, thereby forming the water-soluble salts of the polymers that are used as pigment dispersants. Among the basic compounds that can be used to form the water-soluble salts are sodium hydroxide, potassium hydroxide, ammonium hydroxide, triethylamine, diethanolamine, triethanolamine, dimethylaminoethanol, N-methyldiethanolamine, diisopropanolamine, ethylene diamine, 2-amino-2-methylpropanol, hexamethylenetetramine, pyridine, morpholine, and the like.

The pigment dispersions of this invention comprise from 5% to 35% by weight of one of the aforementioned polymeric dispersants, from 10% to 75% by weight of a pigment component, and 15% to 70% by weight of a solvent component. They preferably contain 10% to 25% by weight of the dispersant, 25% to 60% by weight of the pigment component, and 20% to 50% by weight of the solvent component.

The pigment component of the dispersions may include any of the organic pigments, inorganic pigments, and extender pigments that are conventionally used in the production of surface-coating compositions. Examples of suitable organic pigments include phthalocyanine greens and blues, quinacridones, toluidine reds, indanthrene blue, dioxazines, anthraquinones, lithol reds, thioindigo, and isoindolinones. Useful inorganic pigments include titanium dioxide, zinc oxide, aluminum oxide, magnesium oxide, iron oxides, chromium oxides, zinc sulfides, cadmium sulfides, cadmium selenides, ultramarine blue, lead chromate, and carbon blacks. Examples of the extender pigments that may be present include clay, calcium carbonate, talc, bentonite, kaolin, mica, silica, asbestos, barium sulfate, and barium carbonate.

The solvent component of the pigment dispersions may be water, a water-miscible organic solvent, or a mixture of water and one or more water-miscible organic solvents. Suitable organic solvents include alcohols such as methanol, propanol, butanol, hexanol, ethylene glycol, propylene glycol, and hexylene glycol; ketones such as acetone, methyl ethyl ketone, and diacetone alcohol; ethers such as tetrahydrofuran, tetrahydropyran, and dioxane; esters such as ethyl lactate and ethylene glycol monomethyl ether acetate; and ether alcohols such as ethylene glycol monomethyl ether, ethylene glycol monobutyl ether, diethylene glycol monomethyl ether, dipropylene glycol monomethyl ether, 1-methoxypropanol, and 2-(methoxymethyleneoxy)ethanol. The preferred solvents are water, ethylene glycol, propylene glycol, ethylene glycol, monobutyl ether, and mixtures thereof.

In addition to the dispersant, pigment component, and solvent component, the pigment dispersions of this invention may contain viscosity modifiers, wetting agent, defoamers, biocides, diluents, and other conventional additives.

The pigment dispersions may be prepared by any suitable and convenient procedure. For example, they may be prepared by grinding a mixture that comprises the dispersant, pigment component, and solvent component in a ball mill, pebble mill, sand mill, dispersion mill, colloid mill, or high shear mixer until a uniform dispersion is obtained.

The pigment dispersions of this invention have excellent tinctorial strength and flow properties. Because they are pumpable liquids, they are conveniently handled and easily metered.

Surface-coating compositions generally contain from 1% to 70%, preferably 5% to 40%, by weight of one of the pigment dispersions of this invention, 10% to 98%, preferably 20% to 80%, by weight of a film-forming resin component, and 1% to 80%, preferably 15% to 75%, by weight of a solvent component.

The invention is further illustrated by the examples that follow.

EXAMPLE 1

Ammonium Salt of Hydroxyethyl Methacrylate-Methacrylic Acid-Styrene Terpolymer

Into a four-necked flask equipped with a thermometer, agitator, nitrogen sparge tube, condenser, and two dropping funnels were charged 56.7 grams (0.746 mole) of 1,2-propylene glycol and 100 grams (5.55 moles) of water. The reaction mixture was stirred and heated at 90°–92° C. under nitrogen while 17.5 grams of a 16.6% aqueous ammonium persulfate solution was added to it. The following solutions were added simultaneously to the reaction mixture over a 90 minute period:

(a) a solution consisting of 107.9 grams (0.83 mole) of hydroxyethyl methacrylate, 51.6 grams (0.60 mole) of methacrylic acid, and 10.4 grams (0.10 mole) of styrene and (b) 20 grams of a 16.6% aqueous ammonium persulfate solution. When the addition of the two solutions had been completed, the reaction mixture was stirred and heated at 90°–92° C. for 60 minutes and then cooled with stirring to 80°–85° C. A mixture of 36.4 grams (0.60 mole) of a 28% aqueous solution and 131.9 grams (7.32 moles) of water was added dropwise to the reaction mixture. The resulting solution, which had a pH of 8–8.5, was stirred and heated at 98°–100° C. for 15 minutes, treated with filter aid at 40° C. for 15 minutes, filtered, and cooled. There was obtained 532 grams of a clear yellow solution that contained 35.5% solids on an ammonia-free basis and had a viscosity of 300 cps and a specific gravity of 1.106. The anhydrous terpolymer had an acid value of 198 and a hydroxyl value of 274.

EXAMPLES 2–4

Ammonium Salts of Hydroxyethyl Methacrylate-Methacrylic Acid-Styrene Terpolymers Using the procedure described in Example 1, a series of ammonium salts of other hydroxyethyl methacrylate-methacrylic acid-styrene terpolymers was prepared.

The amounts of the monomers that were used and the properties of the products are given in Table I.

TABLE I

| | Example Number | | |
|---|---|---|---|
| | 2 | 3 | 4 |
| Monomers Used | | | |
| Hydroxyethyl Methacrylate | | | |
| Grams | 107.9 | 52.0 | 65.0 |
| Moles | 0.83 | 0.40 | 0.50 |
| Methacrylic Acid | | | |
| Grams | 51.6 | 86.0 | 51.6 |
| Moles | 0.60 | 1.00 | 0.60 |
| Styrene | | | |
| Grams | 5.2 | 10.4 | 15.6 |
| Moles | 0.05 | 0.10 | 0.15 |
| Weight of Product | | | |
| (Grams) | 488.5 | 420.4 | 497.7 |
| Properties of Product | | | |
| Solids Content (ammonia-free basis) (%) | 36.3 | 43.2 | 40.9 |
| Viscosity (cps) | 300 | 305 | 300 |
| Specific Gravity | 1.107 | 1.120 | 1.115 |
| Acid Value of Anhydrous Terpolymer | 204 | 378 | 254 |
| Hydroxyl Value of Anhydrous Terpolymer | 282 | 151 | 212 |

EXAMPLE 5

Sodium Salt of Hydroxyethyl Methacrylate-Methacrylic Acid-Styrene Terpolymer

One hundred forty grams (1.84 moles) of propylene glycol was stirred at 130° C. under nitrogen while a solution consisting of 75.4 grams (0.58 mole) of hydroxyethyl methacrylate, 38.0 grams (0.42 mole) of methacrylic acid, 10.4 grams (0.10 mole) of styrene, 4.5 grams of benzoyl peroxide, and 1.0 gram of mercaptoethanol was added to it over a period of 2 hours. The reaction mixture was stirred and cooled to 80° C. Then 163.6 grams (0.42 mole) of a 10.2% aqueous sodium hydroxide solution was added to the reaction mixture to bring its pH to 9. The reaction mixture was cooled to room temperature. There was obtained 433 grams of a yellow-brown solution that contained 45.3% solids and had a viscosity of 305 cps and a specific gravity of 1.120. The anhydrous terpolymer had an acid value of 190 and a hydroxyl value of 262.

EXAMPLE 6

Ammonium Salt of Hydroxyethyl Methacrylate-Methacrylic Acid-Styrene Terpolymer

One hundred forty grams (1.84 moles) of propylene glycol was stirred at 130° C. under nitrogen while a solution consisting of 75.4 grams (0.58 mole) of hydroxyethyl methacrylate, 38.0 grams (0.42 mole) of methacrylic acid, 10.4 grams (0.10 mole) of styrene, and 4.5 grams of benzoyl peroxide was added to it over a period of two hours. The reaction mixture was stirred and cooled to 80° C. Then 125.5 grams (0.42 mole) of a 5.7% ammonia solution was added to the reaction mixture to bring its pH to 8–8.5. After cooling, there was obtained 394 grams of a yellow-brown solution that contained 39.1% solids on an ammonia-free basis and had a viscosity of 300 cps and a specific gravity of 1.115. The anhydrous terpolymer had an acid value of 190 and a hydroxyl number of 262.

EXAMPLE 7

Ammonium Salt of Hydroxyethyl Methacrylate-Methacrylic Acid-Glycidyl Methacrylate Terpolymer To a mixture of 56.8 grams (0.74 mole) of 1,2-propylene glycol and 137.5 grams (7.63 moles) of water that had been heated to 90°–92° C. under nitrogen was added a solution of 6.3 grams of ammonium persulfate in 31.5 grams of water. To the reaction mixture was added over a period of 90 minutes a solution consisting of 112.2 grams (0.86 mole) of hydroxyethyl methacrylate, 48.1 grams (0.56 mole) of methacrylic acid, and 14.2 grams (0.1 mole) of glycidyl methacrylate. The reaction mixture was stirred and heated at 90°–92° C. for 60 minutes and then cooled with stirring to 80°–85° C. A mixture of 32.5 grams (0.56 mole) of 28% aqueous ammonia solution and 32.5 grams of water was added dropwise to the reaction mixture. The resulting solution was stirred at 98°–100° C. for 15 minutes, filtered, and cooled to room temperature. There was obtained 471.6 grams of a clear solution that contained 43.5% solids on an ammonia-free basis and had a viscosity of 300 cps and a specific gravity of 1.120. The anhydrous terpolymer had an acid value of 180 and a hydroxyl value of 276.

EXAMPLES 8 AND 9

Ammonium Salts of Hydroxyethyl Methacrylate-Methacrylic Acid-Glycidyl Methacrylate Terpolymers Using the procedure described in Example 7, ammonium salts of other hydroxyethyl methacrylate-methacrylic acid-glycidyl methacrylate terpolymers were prepared.

The amounts of the monomers that were used and the properties of the products are given in Table II.

TABLE II

| | Example Number | |
|---|---|---|
| | 8 | 9 |
| Monomers Used | | |
| Hydroxyethyl Methacrylate | | |
| Grams | 112.2 | 91.0 |
| Moles | 0.86 | 0.70 |
| Methacrylic Acid | | |
| Grams | 48.1 | 48.1 |
| Moles | 0.56 | 0.56 |
| Glycidyl Methacrylate | | |
| Grams | 21.3 | 14.2 |
| Moles | 0.15 | 0.10 |
| Weight of Product | | |
| (Grams) | 598.7 | 552.4 |
| Properties of Product | | |
| Solids Content (ammonia-free basis) (%) | 29.9 | 29.5 |
| Viscosity (cps) | 290 | 290 |
| Specific Gravity | 1.080 | 1.080 |
| Acid Value of Anhydrous Terpolymer | 172 | 204.9 |
| Hydroxyl Value of Anhydrous Terpolymer | 265.6 | 256 |

EXAMPLE 10

Ammonium Salt of Hydroxyethyl Methacrylate-Methacrylic Acid-Styrene Glycidyl Methacrylate Tetrapolymer To a mixture of 56.8 grams (0.74 mole) of 1,2-propylene glycol and 137.5 grams (7.63 moles) of water that had been heated to 90°–92° C. under nitrogen was added a solution of 6.3 grams of ammonium persulfate in 31.5 grams of water. To the reaction mixture was added over a period of 90 minutes a solution consisting of 112.2 grams (0.86 mole) of hydroxyethyl methacrylate, 48.1 grams (0.56 mole) of methacrylic acid, 10.4 grams (0.1 mole) of styrene, and 14.2 grams (0.1 mole) of glycidyl methacrylate. The reaction mixture was stirred and heated at 90°–92° C. for 60 minutes and then cooled with stirring to 80°–85° C. A mixture of 32.5 grams (0.56 mole) of 28% aqueous ammonia solution and 32.2 grams of water was added dropwise to the reaction mixture. The resulting solution was stirred at 98°–100° C. for 15 minutes and then cooled to room temperature. The yellow-brown solution that was obtained contained 45.5% solids on an ammonia-free basis and had a viscosity of 300 cps and a specific gravity of 1.120. The anhydrous tetrapolymer had an acid value of 170 and a hydroxyl value of 260.

EXAMPLE 11

Ammonium-5-Hydroxymethyl-1-aza-3,7-dioxabicyclo-(3,3,0)-octane Salt of Hydroxyethyl Methacrylate-Methacrylic Acid-Styrene Terpolymer The procedure described in Example 1 was repeated except that the reaction mixture was neutralized to pH 8–8.5 using a mixture of 0.60 mole of a 28% aqueous ammonia solution and 0.05 mole of 5-hydroxymethyl-1-aza-3,7-dioxabicyclo-(3,3,0)-octane (Oxazolidine T). There was obtained 478.6 grams of a clear solution that contained 41% solids and that had a viscosity of 300 cps and a specific gravity of 1.105. The anhydrous terpolymer had an acid value of 198 and a hydroxyl value of 274.

COMPARATIVE EXAMPLES

Using the procedure described in Example 1, a series of ammonium salts of other acrylic polymers was prepared.

The amounts of the monomers used and the properties of the products are given in Table III.

TABLE III

| | Comparative Example | | |
|---|---|---|---|
| | A | B | C |
| Monomers Used | | | |
| Hydroxyethyl Methacrylate | | | |
| Grams | 107.9 | — | — |
| Moles | 0.83 | — | — |
| Hydroxyethyl Acrylate | | | |
| Grams | — | 96.3 | 105.0 |
| Moles | — | 0.83 | 0.83 |
| Methacrylic Acid | | | |
| Grams | 22.1 | — | 41.3 |
| Moles | 0.26 | — | 0.48 |
| Acrylic Acid | | | |
| Grams | 24.5 | 43.2 | 8.7 |
| Moles | 0.34 | 0.60 | 0.12 |
| Styrene | | | |
| Grams | 10.4 | 10.4 | 10.4 |
| Moles | 0.10 | 0.10 | 0.10 |
| Weight of Product (Grams) | 532.4 | 557.4 | 576.8 |
| Properties of Product | | | |

TABLE III-continued

|  | Comparative Example | | |
|---|---|---|---|
|  | A | B | C |
| Solids Content (ammonia-free basis) (%) | 45.5 | 27 | 32 |
| Viscosity (cps) | 305 | 290 | 295 |
| Specific Gravity | 1.120 | 1.080 | 1.090 |
| Acid Value of Anhydrous Polymer | 202.7 | 224.5 | 203.5 |
| Hydroxyl Value of Anhydrous Polymer | 282.3 | 310.6 | 281.5 |

EXAMPLE 12

A. A series of pigment dispersions was prepared by mixing together the following materials until a uniform dispersion was obtained:

|  | Parts by Weight |
|---|---|
| Pigment Dispersant | 16.3 |
| Water | 20.3 |
| Propylene glycol | 140.0 |
| Antifoam agent | 4.0 |
| Titanium dioxide (rutile) | 539.2 |

B. Water-based paints were prepared by grinding together the following materials in a pebble mill:

|  | Parts by Weight |
|---|---|
| Pigment Dispersion of Ex. 12A | 102.9 |
| Aqueous dispersion containing 46% acrylic ester copolymer (66% ethyl acrylate, 32.5% methyl acrylate, and 1.5% acrylic acid) | 159.0 |
| Propylene glycol | 13.6 |
| 2,2,4-Trimethylpentane-diol-1,3-monoisobutyrate | 4.5 |
| Water | 1.5 |
| Mildewcide | 6.1 |
| Sodium alkyl ester sulfonate | 0.6 |
| Antifoam agent | 0.8 |
| Hydroxyethylcellulose (as 2.5% aqueous solution) | 18.2 |

The polymers used in the preparation of the pigment dispersion and the properties of the paints are set forth in Table IV.

TABLE IV

|  | Example Number | | | | | | |
|---|---|---|---|---|---|---|---|
|  | 12-1 | 12-2 | 12-3 | 12-4 | 12-5 | 12-6 | 12-7 |
| Polymer Used in Pigment Dispersion | Prod. of Ex. 1 | Prod. of Ex. 5 | Prod. of Ex. 6 | Prod. of Ex. 7 | Prod. of Ex. 9 | Prod. of Ex. 10 | Comparative Polymer* |
| Paint Properties Initial | | | | | | | |
| pH | 8.1 | 7.9 | 8.0 | 8.0 | 8.0 | 8.1 | 8.0 |
| Viscosity (KU) | 83 | 89 | 88 | 83 | 82 | 82 | 81 |
| 60° Gloss | 72 | 68 | 68 | 67 | 68 | 65 | 65 |
| Reflectance (%) | 96.6 | 96.3 | 95.7 | 96.2 | 96.9 | 96.5 | 96.5 |
| Grind (Hegman) | 6.0 | 5.0 | 5.0 | 5.5 | 5.5 | 6.0 | 5.5 |
| Leveling | Good | Good | Good | Good | Good | Good | Good |
| Brushability | Good | Good | Good | Good | Good | Good | Good |
| Aged 1 Month at Room Temperature | | | | | | | |
| pH | 7.8 | 7.9 | 7.9 | 8.0 | 8.0 | 8.0 | 7.9 |
| Viscosity (KU) | 83 | 90 | 88 | 82 | 81 | 83 | 81 |
| 60° Gloss | 70 | 68 | 68 | 65 | 68 | 65 | 65 |
| Reflectance (%) | 96.7 | 96.8 | 96.8 | 96.4 | 96.7 | 96.2 | 96.3 |
| Grind (Hegman) | 6.0 | 5.0 | 5.0 | 5.5 | 5.5 | 5.5 | 5.5 |
| Leveling | Good | Good | Good | Good | Good | Good | Good |
| Brushability | Good | Good | Good | Good | Good | Good | Good |
| Aged 1 Month at 48° C. | | | | | | | |
| pH | 7.8 | 7.8 | 7.8 | 8.0 | 8.1 | 8.0 | 7.9 |
| Viscosity (KU) | 83 | 90 | 88 | 82 | 89 | 84 | 81 |
| 60° Gloss | 71 | 64 | 69 | 68 | 68 | 70 | 66 |
| Reflectance (%) | 97.1 | 97.0 | 96.6 | 97.2 | 96.4 | 96.7 | 96.8 |
| Grind (Hegman) | 6.0 | 5.0 | 5.0 | 5.5 | 5.5 | 5.5 | 5.5 |
| Leveling | Good | Good | Good | Good | Good | Good | Good |
| Brushability | Good | Good | Good | Good | Good | Good | Good |

*Tamol SG-1 (Rohm & Haas)

From the data in Table IV, it will be seen that the paints prepared from the pigment dispersions of this invention were in most cases superior in gloss and hiding power to that prepared from the comparative pigment dispersion and equivalent to it in the other properties tested.

EXAMPLE 13

A series of pigment dispersions was prepared by the following procedure:

The following materials were mixed together to form a homogeneous blend:

|  | Parts by Weight |
|---|---|
| Product of Ex. 1-11 or Comp. Ex. A-C | 15.0 |
| Ethylene Glycol | 31.8 |
| Water | 10.5 |
| Butyl Cellosolve | 4.0 |
| Soya Lecithin | 3.0 |
| Surfactant | 2.5 |

-continued

| | Parts by Weight |
|---|---|
| Dispersing Agent | 0.5 |

To this blend were added 5.7 parts of phthalocyanine blue, 25 parts of talc, and 90 parts of glass beads. The resulting mixture was dispersed on a water-cooled Mini-Mill for 15 minutes and then screened to remove the glass beads. In each case, a smooth, free-flowing pigment dispersion was obtained.

cedure in which a different solvent system was used were blended to the extent of 5% by weight with an alkyd semi-gloss enamel (Glidden Spred Lustre 4618 Pastel Tint Base) or with an acrylic-based paint (Fuller-O'Brien Ful Flow Latex Satin Enamel 614-91 Base).

The results obtained are summarized in Table V. In this table, the solvent systems that were used in the preparation of the pigment dispersions are identified as follows:

A: Ethylene glycol, water, and Butyl Cellosolve
B: Ethylene glycol, water, Butyl Cellosolve, and triethanolamine.

TABLE V

| | Pigment Dispersion | | | | Compatibility with | | |
|---|---|---|---|---|---|---|---|
| Ex. No. | Pigment | Polymer | Amt. of Polymer (%) | Solvent System | Latex based Enamel | Alkyd based Enamel | Rheology |
| 15A | Phthalocyanine blue | Prod of Ex. 1 | 15.4 | A | Good | Very good | Good |
| 15B | Phthalocyanine blue | Prod of Ex. 1 | 15 | B | Very good | Very good | Good |
| 15C | Phthalocyanine blue | Prod of Ex. 5 | 15 | B | Good | Good | Good |
| 15D | Phthalocyanine blue | Prod of Ex. 14 | 15 | B | Good | Very good | Good |
| 15E | Yellow Iron Oxide | Prod of Ex. 1 | 15 | A | Good | Good | Fair |
| 15F | Yellow Iron Oxide | Prod of Ex. 5 | 15 | A | Good | Very good | Fair-Poor |
| 15G | Yellow Iron Oxide | Prod of Ex. 14 | 15 | A | Fair-Good | Very good | Fair |
| 15H | Yellow Iron Oxide | Prod of Comp. Ex. A | 15 | A | Good | Very poor | Fair-Poor |
| 15I | Yellow Iron Oxide | Prod of Comp. Ex. B | 15 | A | Very poor | Very poor | Very poor |
| 15J | Yellow Iron Oxide | Prod of Comp. Ex. C | 15 | A | Very poor | Very poor | Very poor |

EXAMPLE 14

A series of pigment dispersions was prepared by the following procedure:

The following materials were mixed together to form a homogeneous blend:

| | Parts by Weight |
|---|---|
| Product of Ex. 1-11 or Comp. Ex. A-C | 15.0 |
| Ethylene Glycol | 9.0 |
| Water | 10.5 |
| Butyl Cellosolve | 4.0 |
| Soya Lecithin | 5.0 |
| Alkyl aryl sulfonate | 0.5 |
| Dispersing Agent | 1.0 |

To this blend were added 55 parts of yellow iron oxide (Mapico Yellow 1075) and 70 parts of glass beads. The resulting mixture was dispersed on a water-cooled Mini-Mill for 15 minutes and then screened to remove the glass beads. In each case, a smooth, free-flowing pigment dispersion was obtained.

EXAMPLE 15

Pigment dispersions that were prepared by the procedure of Example 13 or Example 14 or by a similar pro- From the data in Table V, it will be seen that the substitution of acrylic acid for all or part of the methacrylic acid and the substitution of hydroxyethyl acrylate for hydroxyethyl methacrylate in the preparation of the polymers results in deterioration of their functional properties (compare Example 15A with Comparative Examples 15H-J).

What is claimed is:

1. A pigment dispersion that comprises
    (a) 10% to 75% by weight of a pigment component;
    (b) 5% to 35% by weight of a dispersant that is a water-soluble salt of a polymer derived from
        (1) 30% to 75% by weight of at least one hydroxyalkyl methacrylate wherein the hydroxyalkyl group has from 2 to 4 carbon atoms;
        (2) 20% to 65% by weight of methacrylic acid; and
        (3) 2% to 20% by weight of at least one ethylenically-unsaturated monomer selected from the group consisting of styrene, vinyltoluene, glycidyl acrylate, and glycidyl methacrylate,
        said polymer having an acid value in the range of 160 to 400 and a hydroxyl value in the range of 150 to 320; and (c) 15% to 70% by weight of a solvent selected from the group consisting of water, water-miscible organic solvents, and mixtures thereof.

2. A pigment dispersion as set forth in claim 1 wherein the dispersant is an alkali metal, ammonium, or amine salt of a polymer derived from
(a) 55% to 65% by weight of at least one hydroxyalkyl methacrylate;
(b) 30% to 40% by weight of methacrylic acid; and
(c) 5% to 15% by weight of at least one ethylenically-unsaturated monomer selected from the group consisting of styrene, vinyltoluene, glycidyl acrylate, and glycidyl methacrylate,
said polymer having an acid value in the range of 170 to 210 and a hydroxyl value in the range of 255 to 310.

3. A pigment dispersion as set forth in claim 1 wherein the dispersant is the ammonium salt of said polymer.

4. A pigment dispersion as set forth in claim 2 wherein the dispersant is a water-soluble salt of a polymer derived from hydroxyethyl methacrylate, methacrylic acid, and styrene.

5. A pigment dispersion as set forth in claim 2 wherein the dispersant is a water-soluble salt of a polymer derived from hydroxyethyl methacrylate, methacrylic acid, and glycidyl methacrylate.

6. A pigment dispersion as set forth in claim 2 wherein the dispersant is a water-soluble salt of a polymer derived from hydroxyethyl methacrylate, methacrylic acid, styrene, and glycidyl methacrylate.

7. A pigment dispersion as set forth in claim 2 wherein the solvent is a mixture of water and water-miscible organic solvents.

8. A pigment dispersion as set forth in claim 2 wherein the solvent is selected from the group consisting of water, ethylene glycol, propylene glycol, ethylene glycol monobutyl ether, and mixtures thereof.

9. A pigment dispersion as set forth in claim 1 that comprises
(a) 25% to 60% by weight of a pigment component;
(b) 10% to 25% by weight of said dispersant; and
(c) 20% to 50% by weight of said solvent.

10. A surface-coating composition containing a pigment dispersion as defined in claim 1.

11. A surface-coating composition as set forth in claim 10 that contains 1% to 70% by weight of said pigment dispersion, 10% to 98% by weight of a film-forming resin component, and 1% to 80% by weight of a solvent component.

12. A surface-coating composition as set forth in claim 11 wherein the film-forming resin component comprises an alkyd resin.

13. A surface-coating composition as set forth in claim 11 wherein the film-forming resin component comprises an acrylic resin.

14. A polymeric dispersant for dispersing pigments in surface-coating compositions that is a water-soluble salt of a polymer derived from
(a) 30% to 75% by weight of at least one hydroxyalkyl methacrylate wherein the hydroxyalkyl group has from 2 to 4 carbon atoms;
(b) 20% to 65% by weight of methacrylic acid; and
(c) 2% to 20% by weight of at least one ethylenically-unsaturated monomer selected from the group consisting of styrene, vinyltoluene, glycidyl acrylate, and glycidyl methacrylate, said polymer having an acid value in the range of 160 to 400 and a hydroxyl value in the range of 150 to 320.

15. A polymeric dispersant as set forth in claim 14 that is an alkali metal, ammonium, or amine salt of a polymer derived from
(a) 55% to 65% by weight of at least one hydroxyalkyl methacrylate,
(b) 30% to 40% by weight of methacrylic acid, and
(c) 5% to 15% by weight of at least one ethylenically-unsaturated monomer selected from the group consisting of styrene, vinyltoluene, glycidyl acrylate, and glycidyl methacrylate,
said polymer having an acid value in the range of 170 to 210 and a hydroxyl value in the range of 255 to 310.

16. A polymeric dispersant as set forth in claim 14 wherein the polymer is derived from hydroxyethyl methacrylate, methacrylic acid, and styrene.

17. A polymer dispersant as set forth in claim 14 wherein the polymer is derived from hydroxyethyl methacrylate, methacrylic acid, and glycidyl methacrylate.

18. A polymeric dispersant as set forth in claim 14 wherein the polymer is derived from hydroxyethyl methacrylate, methacrylic acid, styrene, and glycidyl methacrylate.

19. A polymeric dispersant as set forth in claim 14 that is the ammonium salt of said polymer.

* * * * *